United States Patent
Sun

(10) Patent No.: US 8,300,396 B2
(45) Date of Patent: Oct. 30, 2012

(54) MOUNTING FRAME FOR HARD DISK

(75) Inventor: Zheng-Heng Sun, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 268 days.

(21) Appl. No.: 12/911,846

(22) Filed: Oct. 26, 2010

(65) Prior Publication Data

US 2012/0075791 A1    Mar. 29, 2012

(51) Int. Cl.
 *G06F 1/16* (2006.01)
(52) U.S. Cl. ............... 361/679.33; 248/634; 360/98.08; 312/223.2
(58) Field of Classification Search ............... 211/26; 248/672, 316.7, 310, 636, 27.3, 634, 615, 248/201, 220.31, 221.11; 361/690, 747, 361/728, 679.33, 679.34, 679.06, 679.46, 361/679.36, 679.37, 679.39, 679.02; 360/97.19, 360/75, 256.2, 244.8, 923, 78.04, 98.08, 360/99.23, 133; 345/156, 588, 172, 76; 439/540.1, 439/752, 853, 135; 312/223.3, 332.1, 244, 312/270.3, 45, 30, 333, 223.2
See application file for complete search history.

(56) References Cited

U.S. PATENT DOCUMENTS

| | | | |
|---|---|---|---|
| 7,643,289 B2 * | 1/2010 | Ye et al. | 361/690 |
| 2008/0265125 A1 * | 10/2008 | Ye et al. | 248/672 |
| 2011/0235266 A1 * | 9/2011 | Sun | 361/679.33 |
| 2012/0097623 A1 * | 4/2012 | Zhang et al. | 211/26 |

* cited by examiner

*Primary Examiner* — Hung Duong
(74) *Attorney, Agent, or Firm* — Altis Law Group, Inc.

(57) ABSTRACT

A mounting frame for hard disk includes a frame and latching members, the frame includes two opposite frame arms including a wall and supporting bases laterally extending from one wall toward the other wall, the wall defines receiving grooves to form wall sections, and a compartment is defined between opposite wall sections. The compartments respectively receive hard disks, the supporting bases support the hard disks and secure with the hard disks to prevent the hard disks from moving along a first direction; Each latching member engages with the opposite receiving grooves, separate adjacent hard disks, and prevent hard disk from sliding along a second direction perpendicular with the first direction.

18 Claims, 4 Drawing Sheets

MOUNTING FRAME FOR HARD DISK

BACKGROUND

1. Technical Field

The disclosure relates to mounting frames, and particularly to a mounting frame for mounting hard disks.

2. Description of Related Art

Hard disks for computers are usually often fixed in a frame in a housing. Each hard disk may be attached with screws. The screws can be difficult to work with when changing out hard disks.

Therefore, there is room for improvement within the art.

BRIEF DESCRIPTION OF THE DRAWINGS

Many aspects of the present mounting frame for hard disk can be better understood with reference to the following drawings. The components in the various drawings are not necessarily drawn to scale, the emphasis instead being placed upon clearly illustrating the principles of the present disclosure. Moreover, in the drawings, like reference numerals designate corresponding parts throughout the diagrams.

DETAILED DESCRIPTION

Figure 1:
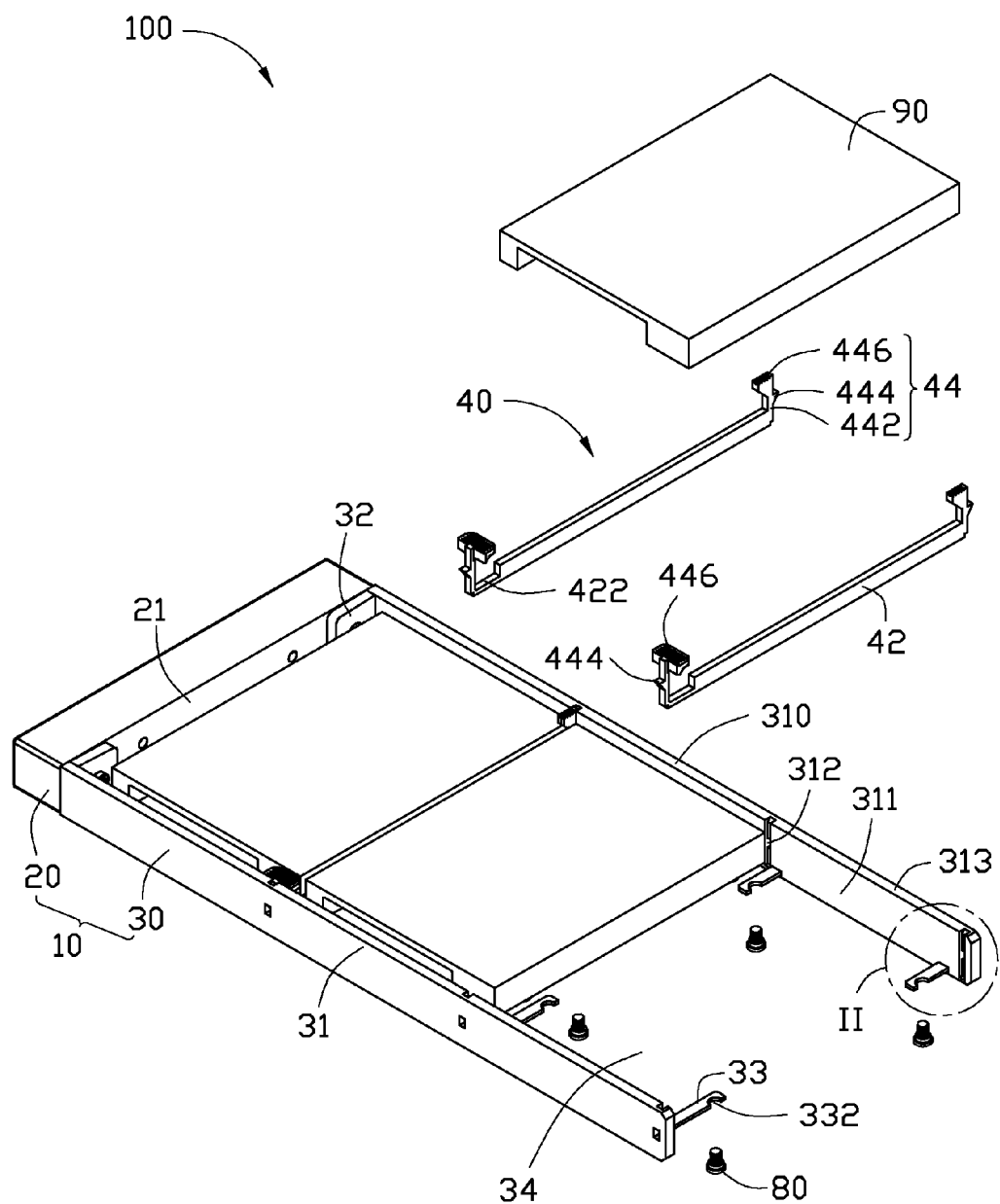
FIG. 1 is a partially disassembled view of a mounting frame with hard disks according to an exemplary embodiment.

FIG. 1 shows a mounting frame 100 assembled hard disks 90 according to an exemplary embodiment. The mounting frame 100 includes a frame 10 and detachable latching members 40.

The frame 10 includes a connecting arm 20, two frame arms 30 perpendicularly secured to a connecting surface 21 of the connecting arm 20. Each frame arm 30 is located at one end of the connecting arm 20. Each frame arm 30 includes a wall 31, a connecting flange 32, and supporting bases 33. The wall 31 has a side surface 311 and a top surface 313 perpendicular to the side surface 311. Each wall 31 defines spaced-apart receiving grooves 312 in the side surface 311. Accordingly, a wall section 310 is formed between each two adjacent receiving grooves 312 of a side surface 311 A compartment 34 is enclosed by opposite wall sections 310 of the opposite frame arms 30. Each compartment 34 can receive a hard disk 90.

Figure 2:
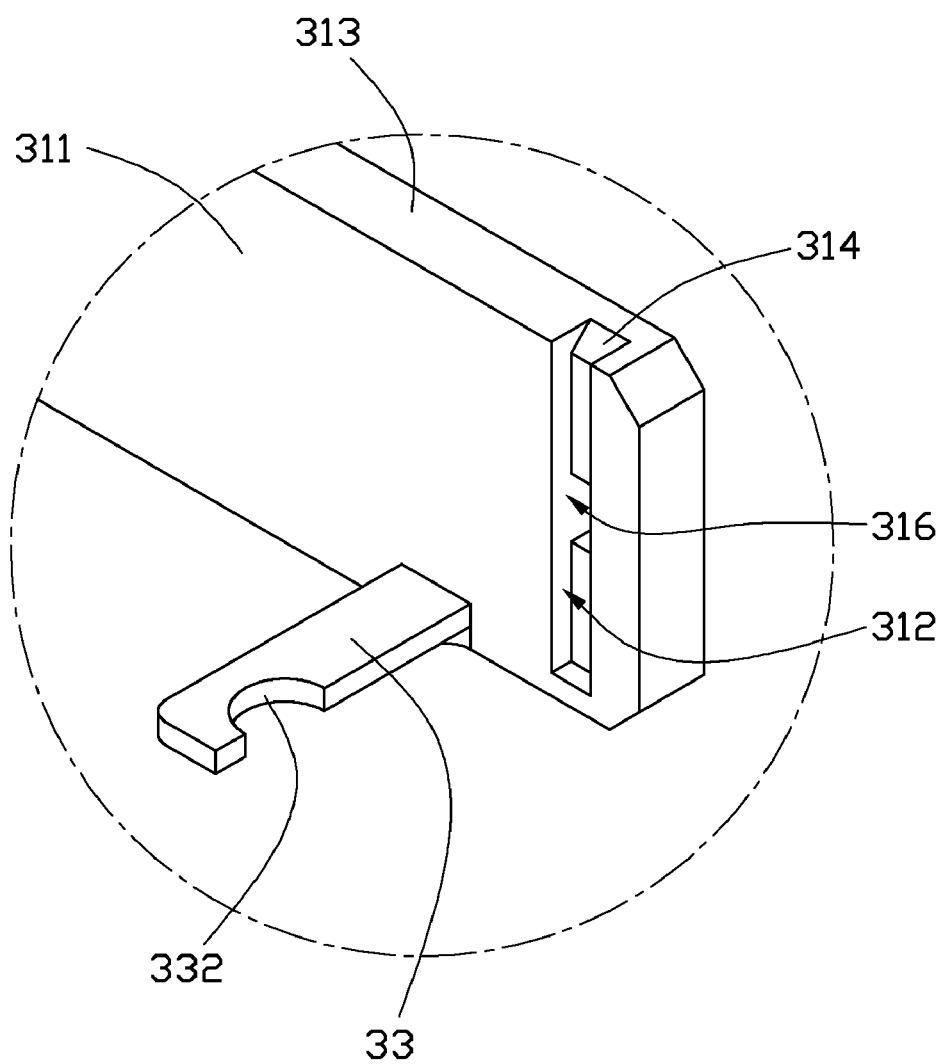
FIG. 2 is an enlarged schematic view of a circled portion of the mounting frame shown in FIG. 1.

Referring further to FIG. 2, each receiving groove 312 extends along the side surface 311 through the top surface 313. The bottom wall of the receiving groove 312 defines a slanted notch 314 exposed to the top surface 313 and a latching hole 316 communicating with the receiving groove 312. The latching hole 316 is located at the middle of the receiving groove 312 and is wedge shaped.

The connecting flange 32 protrudes perpendicularly from the side surface 311, and is secured to the connecting surface 21 of the connecting arm 20. The supporting bases 33 extend laterally from the side surface 311, adjacent to the bottom surface of the wall 31. In the exemplary embodiment, two supporting bases 33 are positioned in each wall section 310, adjacent to two receiving grooves 312. Each supporting base 33 defines an arcuate cutout 332. The cutout 332 is defined opposite to the connecting flange 32.

The latching member 40 can latch in each opposite receiving groove 312 of the walls 31. The latching member 40 includes a bar portion 42 and two latching portions 44 extending perpendicularly from each end of the bar portion 42. The bar portion 42 defines a slot 422 adjacent to an end for passing of wires. The latching portion 44 is elastic and can be deformed toward the bar portion 42. The latching portion 44 is configured to latch into the receiving grooves 312 of the wall 31. The latching portion 44 includes a pole 442 perpendicular to the bar portion 42, a wedge shaped rib 444, and a pressing plate 446. The rib 444 extends laterally from a side of the pole 442 opposite to the bar portion 42. The rib 444 can engage in the latching hole 316 of the wall 31. The pressing plate 446 at the top of the pole 442 laterally extends from the opposite side of the pole 442. The latching portion 44 elastically bends towards the bar portion 42 during pressing of the pressing plate 446.

Figure 3:
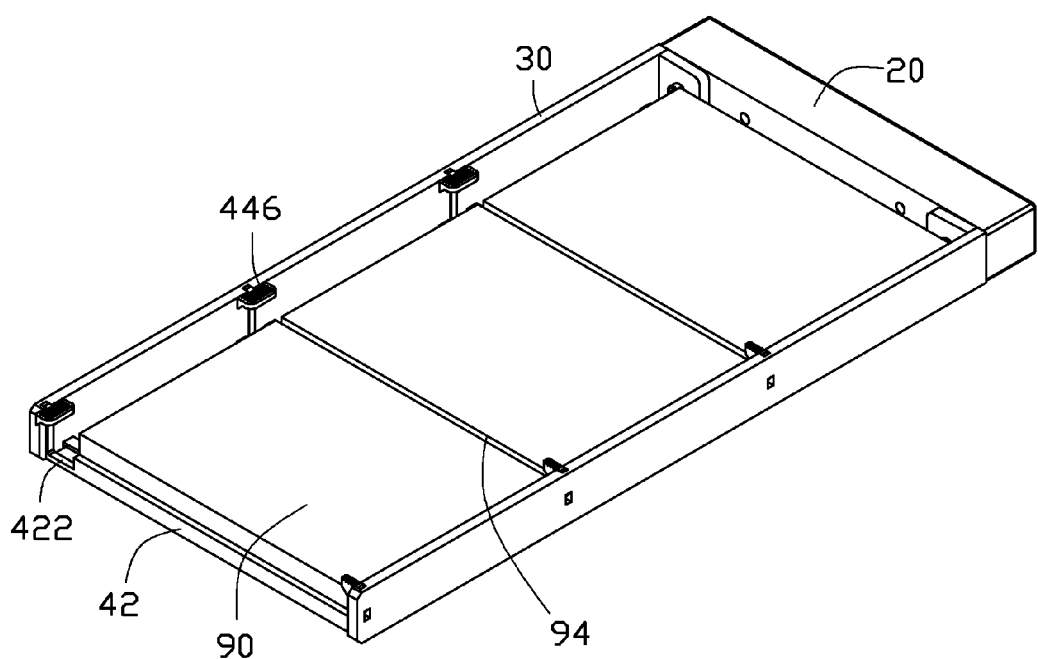
FIG. 3 is a schematic assembled view of the mounting frame with hard disks shown in FIG. 1.
Figure 4:
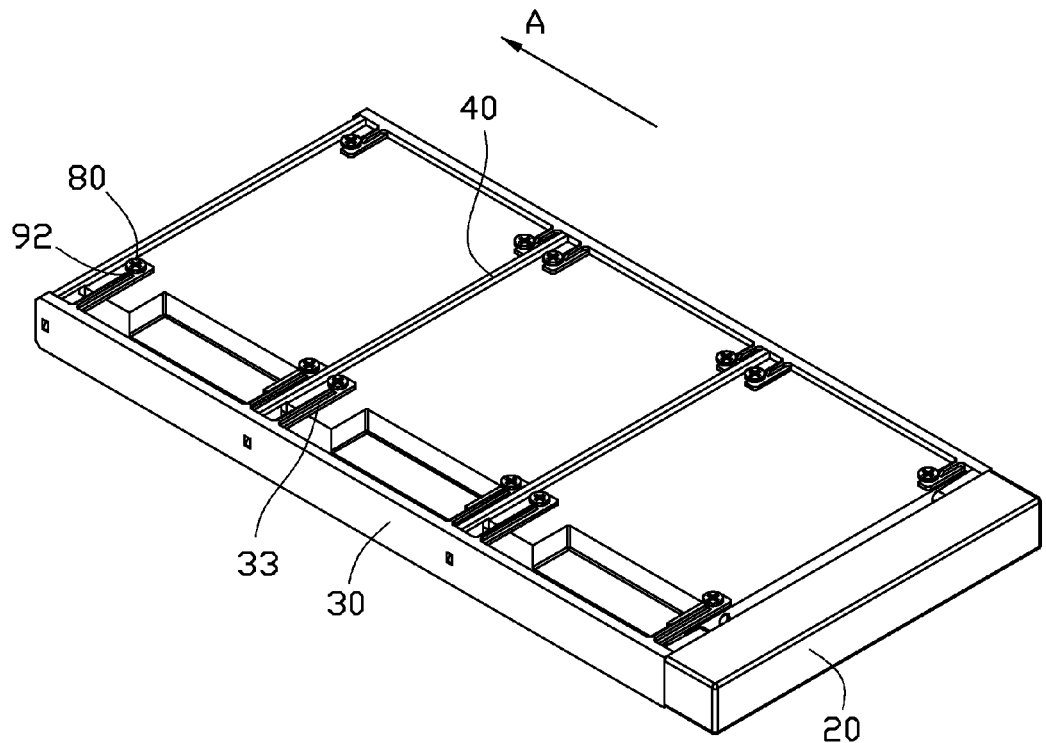
FIG. 4 is similar to FIG. 3 but from another view.

Referring to FIGS. 3 and 4, to assemble hard disks 90 in the mounting frame 100, the hard disks 90 are placed into their respective compartments 34 and are supported by the supporting bases 33. Fixing holes 92 are defined in the bottom surface of each hard disk 90 which are aligned with the cutouts 332. Fixing pins 80 are provided and extended through the cutouts 332 to engage in the fixing holes 92. The distal end of each fixing pin 80 has a larger diameter than the cutouts 332 and cannot pass through any cutout 332. A space 94 is defined between two adjacent hard disks 90, aligned with two corresponding receiving grooves 312. At this time, the hard disks 90 cannot slide vertically along the first direction, but can slide along a horizontal second direction perpendicular to the first direction. Then, the latching members 40 are pressed downwardly into the spaces 94. The slanted notches 314 allow smooth engagement of the latching members 40. The bar portion 42 is received in the space 94 to separate the two adjacent hard disks 90 from each other. The two latching portions 44 are engaged in the receiving grooves 312. The pole 442 is received in the receiving groove 312 and the rib 444 is latched into the corresponding latching hole 316 of the wall 31. The hard disks 90 are prevented from sliding along the second direction by the bar portion 42 of the latching member 40. Therefore, the hard disks 90 are assembled. Wires of the hard disks 90 can extend through the slot 422 for making electrical connections.

To remove the hard disks 90 from the mounting frame 100, the latching portions 44 are pressed by the pressing plate 446 to deform towards the bar portions 42 causing the ribs 444 to withdraw from the latching holes 316. Accordingly, the latching members 40 can be pulled upward. After that, the hard disks 90 are slid one at a time in direction A and removed from the mounting frame 100.

Understandably, after the hard disks 90 have been removed, the fixing pins 80 are not needed to detach from the hard disks 90. To assemble the hard disks 90, the hard disk 90 is pushed along a direction reveres to the direction A, and the fixing pins 80 can be slid into the cutout 332.

It is to be understood that even though numerous characteristics and advantages of the present embodiments have been set forth in the foregoing description, together with details of structures and functions of various embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A mounting frame for hard disks, comprising:
a frame including two opposite frame arms, each frame arm including a wall and supporting bases, each wall defining receiving grooves to form wall sections, the supporting bases laterally extending from one wall section towards the opposite other wall section, and a compartment being enclosed between opposite wall sections, each supporting base defining a cutout, the cutouts being defined at the same sides of the supporting bases;
latching members; wherein:
each compartment respectively receives a hard disk, the supporting bases support the hard disks, fixing pins extend through the cutouts and secure with the hard disks to prevent the hard disks from moving in a first direction, each latching member engages with the opposite receiving grooves, separate adjacent hard disks, and prevent the hard disk from sliding along a second direction, perpendicular with the first direction.

2. The mounting frame for hard disk as claimed in claim 1, wherein the frame includes a connecting arm, the two frame arms are respectively perpendicularly secured on a connecting surface of the connecting arm, and located at two ends of the connecting arm.

3. The mounting frame for hard disk as claimed in claim 2, wherein the frame arm has a connecting flange protruding perpendicularly form the side surface of the wall, the connecting flange is located an end of the wall and secures on the connecting surface of the connecting arm.

4. The mounting frame for hard disk as claimed in claim 3, wherein the cutout is arcuate and defined at a side reverse the connecting flange.

5. The mounting frame for hard disk as claimed in claim 1, wherein the wall defines the receiving grooves evenly spaced at the side surface to accordingly form the wall sections.

6. The mounting frame for hard disk as claimed in claim 1, wherein the receiving groove defines a slanted notch, the notch is located at an end of the receiving groove and exposed to the top surface of the wall, the notch allow smooth engagement of the latching members.

7. The mounting frame for hard disk as claimed in claim 1, wherein the latching member includes a bar portion and two latching portions respectively perpendicularly extending at the two ends of the bar portion, the two latching portions engages with the opposite receiving grooves.

8. The mounting frame for hard disk as claimed in claim 7, wherein the latching portion includes a pole perpendicular with the bar portion and a wedged rib laterally extends from the pole, the pole is received in receiving groove, the receiving groove defines a wedged latching hole to receive the rib.

9. The mounting frame for hard disk as claimed in claim 8, wherein the pole laterally extends a pressing plate at the top of the pole, the latching portion deflects towards the bar portion by pressing the pressing plate.

10. The mounting frame for hard disk as claimed in claim 8, wherein the bar portion defines a slot adjacent to an end for passing of wires of the hard disks through.

11. The mounting frame for hard disk as claimed in claim 7, wherein the latching portion is elastic and can be deflected toward to the bar portion.

12. The mounting frame for hard disk as claimed in claim 1, wherein the supporting bases laterally extend from the side surface of the wall, and adjacent to the bottom surface of the wall.

13. A mounting frame for hard disk, comprising:
a frame including two opposite frame arms, the frame arm including a wall and supporting bases laterally extending from one wall towards the other wall, each wall defining receiving grooves to form wall sections, a compartment being defined between two opposite wall sections;
latching members; wherein:
the compartments respectively receive hard disks, the supporting bases support the hard disks and latch with the hard disks to prevent the hard disks from moving along a first direction, each latching member engages with the opposite receiving grooves, separate adjacent hard disks, and prevent the hard disk from sliding along a second direction perpendicular with the first direction.

14. The mounting frame for hard disk as claimed in claim 13, wherein the supporting bases define cutouts at the same side, fixing pins pass through the cutouts and secure with the hard disks.

15. The mounting frame for hard disk as claimed in claim 14, wherein the cutout is arcuate.

16. The mounting frame for hard disk as claimed in claim 13, wherein the latching member includes a bar portion and two latching portions respectively perpendicularly extending at the two ends of the bar portion, the two latching portions engages with the opposite receiving grooves.

17. The mounting frame for hard disk as claimed in claim 16, wherein the latching portion includes a pole perpendicular with the bar portion and a wedged rib laterally extends from the pole, the pole is received in receiving groove, the receiving groove defines a wedged latching hole to receive the rib.

18. The mounting frame for hard disk as claimed in claim 17, wherein the pole laterally extends a pressing plate at the top of the pole, the latching portion deflects towards the bar portion by pressing the pressing plate.

* * * * *